United States Patent
Tsuge (10) Patent No.: US 6,848,745 B1
(45) Date of Patent: Feb. 1, 2005

(54) SEAT FOR VEHICLE (75) Inventor: Yoshikatsu Tsuge, Nagoya (JP)

(73) Assignee: Chuo Hatsujo Kabushiki Kaisha, Aichi (JP)

( * ) Notice: Subject to any disclaimer, the term of this patent is extended or adjusted under 35 U.S.C. 154(b) by 0 days.

(21) Appl. No.: 10/129,083

(22) PCT Filed: Nov. 2, 2000

(86) PCT No.: PCT/JP00/07776
§ 371 (c)(1),
(2), (4) Date: Aug. 30, 2002

(87) PCT Pub. No.: WO01/32463
PCT Pub. Date: May 10, 2001

(30) Foreign Application Priority Data

Nov. 5, 1999 (JP) .......................................... 11/315695

(51) Int. Cl.$^7$ .............................................. B60N 2/02
(52) U.S. Cl. ..................................................... 297/367
(58) Field of Search ................................ 297/367, 366, 297/362.12; 74/500.5, 82; 16/221, 235

(56) References Cited

U.S. PATENT DOCUMENTS

| | | | | |
|---|---|---|---|---|
| 3,001,821 A | * | 9/1961 | Marechal | 297/366 |
| 4,822,101 A | * | 4/1989 | Hosoe | 297/378.12 |
| 4,913,494 A | * | 4/1990 | Ikegaya | 297/367 |
| 5,352,019 A | * | 10/1994 | Bauer et al. | 297/341 |
| 5,820,218 A | | 10/1998 | Baloche | |
| 5,947,560 A | * | 9/1999 | Chen | 297/362.12 |
| 6,619,744 B2 | * | 9/2003 | Reubeuze | 297/378.12 |

FOREIGN PATENT DOCUMENTS

| | | |
|---|---|---|
| JP | 57-39631 Y2 | 9/1982 |
| JP | 2-39930 U | 3/1990 |
| JP | 3-39442 U | 4/1991 |
| JP | 4-296213 A | 10/1992 |
| JP | 5-22117 Y2 | 6/1993 |
| JP | 11-269786 A | 10/1999 |

* cited by examiner

Primary Examiner—Milton Nelson, Jr.
(74) Attorney, Agent, or Firm—Birch, Stewart, Kolasch & Birch, LLP (57) ABSTRACT Vehicle seats are provided with a switching mechanism for switching a seat condition that is reliably actuated. Vehicle seat 10 may include input side switching mechanism 50 that receives an input of a manipulating force, and output side switching mechanism 70 that is actuated in synchronization with input side switching mechanism 50. Seat 10 may additionally include a control cable that is connected to input side switching mechanism 50 and output side switching mechanism 70 and that transmits the input of the manipulating force, which input side switching mechanism 50 receives, to output side switching mechanism 70. The control cable may include a strand type outer casing and an inner cable, which is movably inserted within the outer casing. In vehicle seat 10, because the outer casing of the control cable is strand type, shrinkage of the outer casing is prevented, which reduces stroke length loss. Accordingly, the manipulating force that is applied to input side switching mechanism 50 is transmitted to output side switching mechanism 70 while the stroke length loss is minimized. Thus, actuation of output side switching mechanism 70 is ensured.

20 Claims, 9 Drawing Sheets

SEAT FOR VEHICLE

FIELD OF THE INVENTION

The present invention relates to vehicle seats and more particularly, relates to vehicle seats having a switching mechanism for switching a seat condition.

BACKGROUND ART

Known vehicle seats have a switching mechanism that switches a seat condition according to the shape and size of the passenger who is sitting on the seat. Examples of such switching mechanisms are a sliding mechanism for sliding the seat with respect to a floor, a reclining mechanism for tilting a seat back (i.e., a back rest) relative to a seat cushion (i.e., the portion on which the passenger sits), and a jump mechanism for quickly moving the seat upward from the floor into a folded position. Generally speaking, the switching mechanism is locked in order to hold the seat in a specific condition and is unlocked in order to allow the seat condition to be switched. Therefore, the switching mechanism is required to lock in a stable manner so as to prevent unintentional unlocking. A reclining mechanism, which is a typical switching mechanism, will now be described in detail.

Recent vehicle seats provide reclining mechanisms on both sides of the seat. Each of such vehicle seats has a structure in which a manipulation lever is provided on one side of the seat in order to switch the reclining mechanism from a locked condition to an unlocked condition. In such a structure, movement of the manipulation lever is directly transmitted to the reclining mechanism that is coupled to the manipulation lever (hereinafter referred to as an input side reclining mechanism). On the other hand, the movement of the manipulation lever is transmitted via a transmission member to the reclining mechanism that is not coupled to the manipulation lever (hereinafter referred to as an output side reclining mechanism). One known example of this type of vehicle seat utilizes a control cable that serves as a transmission member (e.g., Japanese Unexamined Utility Model Publication No. 3-39442).

In the vehicle seat disclosed in the above-described Publication, one end of the control cable is coupled to a manipulation lever and the other end of the control cable is coupled to an output side manipulation member. When the manipulation lever is rotated, the end of the control cable that is coupled to the manipulation lever is pulled (stroked) and the length of the stroke is transmitted to the output side manipulation member. Consequently, the output side manipulation member only pivots by the amount of transmitted stroke length and the output side reclining mechanism is actuated.

However, the vehicle seat described in the above Publication has the following problems. That is, the control cable that connects the reclining mechanisms, which are provided on both sides of the vehicle seat, includes an inner cable, which transmits the stroke length, and an outer casing, which is disposed around the inner cable. The respective ends of the outer casing are fixed to each respective side of the seat cushion of the vehicle seat. One end of the inner cable is coupled to the manipulation lever. The other end thereof is coupled to the output side manipulation member. The control cable connects the manipulation lever to the output side manipulation member such that the control cable extends along the outside of the vehicle seat. Therefore, the control cable does not extend in a straight line, but rather extends along a curved line.

When the manipulation lever is pivoted and the inner cable is pulled, the inner cable contacts the outer casing and a compressive force acts on the outer casing. As a result, the inner cable stretches and the outer casing shrinks. Consequently, the movement of the manipulation lever is not satisfactorily transmitted to the output side manipulation member (i.e., a stroke length loss results), so that actuation of the output side reclining mechanism fails. For such reason, control cables have not been used as a transmission member. Instead, another member, such as a rod, has been used as the transmission member.

As described above, in the known vehicle seat having the plurality of switching mechanisms that switch the seat condition, the manipulation force applied to the input side mechanism is not adequately transmitted to the output side mechanism when the input side mechanism and the output side mechanism are actuated via the cable. Therefore, the seat can not be reliably switched between a locked condition and unlocked condition.

Accordingly, it is an object of the present invention to provide vehicle seats capable of reliably actuating the output side mechanism using a control cable that minimizes stroke length loss.

SUMMARY OF THE INVENTION

Vehicle seats according to the present invention include a switching mechanism that switches a seat condition. The switching mechanism comprises an input side switching mechanism that receives an input of a manipulation force, an output side switching mechanism that is actuated in synchronization with the input side switching mechanism, and a control cable that is connected to the input side switching mechanism and the output side switching mechanism and that transmits the input of the manipulation force, which the input side switching mechanism receives, to the output side switching mechanism. The control cable includes a strand-type outer casing and an inner cable movably inserted within the outer casing.

In vehicle seats of the present invention, the manipulation force that is applied to the input side switching mechanism is transmitted to the output side switching mechanism by the control cable, which has a strand-type outer casing. Because the strand-type outer casing does not easily deform, shrinkage of the outer casing is minimized, therefore, stroke length loss is also minimized. Thus, the output side switching mechanism can be reliably actuated.

The inner cable preferably may be a single-strand type. Because a single-strand type inner cable does not easily stretch, stroke length loss of the inner cable is minimized. This feature enables the output side switching mechanism to be actuated more reliably.

The vehicle seats may use a push/pull type inner cable that includes a main wire, which serves as a core wire. The push/pull type cable is capable of transmitting a compressive force as well as a tensile force. Accordingly, the input and output side switching mechanisms can be actuated more reliably.

The present invention may suitably be utilized in a vehicle seat having a reclining mechanism that inclines a seat back relative to a seat cushion. The vehicle seat having the seat cushion and the seat back that is supported by the seat cushion may include a manipulation lever that is provided on one side of the seat. The vehicle seat may include an input side reclining mechanism that is provided on the same side as the manipulation lever. When the manipulation lever is rotated, the input side reclining mechanism switches the seat back between a locked condition, in which inclination of the seat back relative to the seat cushion is prevented, and an unlocked condition, in which inclination of the seat back relative to the seat cushion is permitted. The vehicle seat may include an output side manipulation member that is provided on the opposite side of the manipulation lever. The vehicle seat may include a control cable that transmits the movement of the manipulation lever to the output side manipulation member. The vehicle seat may include an output side reclining mechanism. When the movement of the manipulation lever is transmitted and the output side manipulation member consequently pivots, the output side reclining mechanism switches the seat back between the locked condition and the unlocked condition. The control cable preferably includes a strand-type outer casing and an inner cable movably inserted within the outer casing.

The vehicle seat also uses a strand-type outer casing in order to minimize stroke length loss, which ensures actuation of the output side reclining mechanism.

In a vehicle seat that includes the reclining mechanism, the distance between a position, at which the inner cable is coupled to the output side manipulation member, and the rotational center of the output side manipulation member is preferably adjusted in order to reduce stroke length loss of the control cable to an allowable stroke length loss or less. That is, as the distance between the coupled position of the inner cable and the rotational center of the output side manipulation member increases, the tensile force that acts on the inner cable decreases. That is, because the distance increases, a releasing moment for actuating the output side reclining mechanism can be generated using a small force (tensile force). Therefore, by adjusting the coupled position of the inner cable, stroke length loss of the control cable can be limited to the allowable stroke length loss or less. Thus, the output side reclining mechanism can be reliably switched.

In addition, the outer casing may include an adjusting means, which adjusts the effective length of the outer casing. According to this vehicle seat, by adjusting the adjuster means when the control cable is installed, it is possible to adjust the effective length (freely-movable length) of the control cable. Therefore, when the length of the outer casing must be finely adjusted, the length can be easily adjusted while the ends of the control cable are retained.

Further, the control cable is preferably disposed between the seat cushion and the vehicle body floor. Accordingly, when a passenger sits on the seat, the control cable does not interfere with the passenger.

Further, the control cable preferably includes a predetermined extra length in addition to the minimum length that is required to dispose the wire between the input and output side switching mechanisms. Thus, even if the seat is deformed due to an accident, deformation of the seat can be absorbed by the control cable, which includes the predetermined extra length.

Preferably, the vehicle seat may also use a single-strand type inner cable or a push/pull type inner cable that includes a main wire serving as a core wire.

The present invention may suitably be utilized in a vehicle seat of an automobile. The vehicle seat of the automobile that has a seat cushion and a seat back supported by the seat cushion may comprise a manipulation lever that is provided on one side of the seat, and an input side reclining mechanism that is provided on the same side as the manipulation lever. When the manipulation lever is rotated, the input side switching mechanism switches the seat back between a locked condition, in which inclination of the seat back relative to the seat cushion is prevented, and an unlocked condition, in which inclination of the seat back relative to the seat cushion is permitted. The vehicle seat of the automobile may include an output side manipulation member that is provided on the side that is opposite to the side where the manipulation lever is provided. The vehicle seat of the automobile may include a control cable, which transmits movement of the manipulation lever to the output side manipulation member, and an output side reclining mechanism. When movement of the manipulation lever is transmitted and the output side manipulation member consequently pivots, the output side reclining mechanism switches the seat back between the locked condition and the unlocked condition. The control cable may include a strand-type outer casing and an, inner cable movably inserted within the outer casing. The position where the inner cable is coupled to the output side manipulation member is preferably spaced 30 mm to 70 mm from the rotational center of the output side manipulation member.

According to this automobile seat, because the distance from the rotational center to the coupled position of the inner cable is greater than or equal to 30 mm, stroke length loss of the control cable can be reduced to the allowable stroke length loss or less. Thus, the output side reclining mechanism can be reliably actuated. Further, because the distance from the rotational center to the coupled position is less than or equal to 70 mm, the output side manipulation member can be disposed within the thickness of the seat.

PREFERRED EMBODIMENTS FOR PRACTICING THE INVENTION

Figure 1:
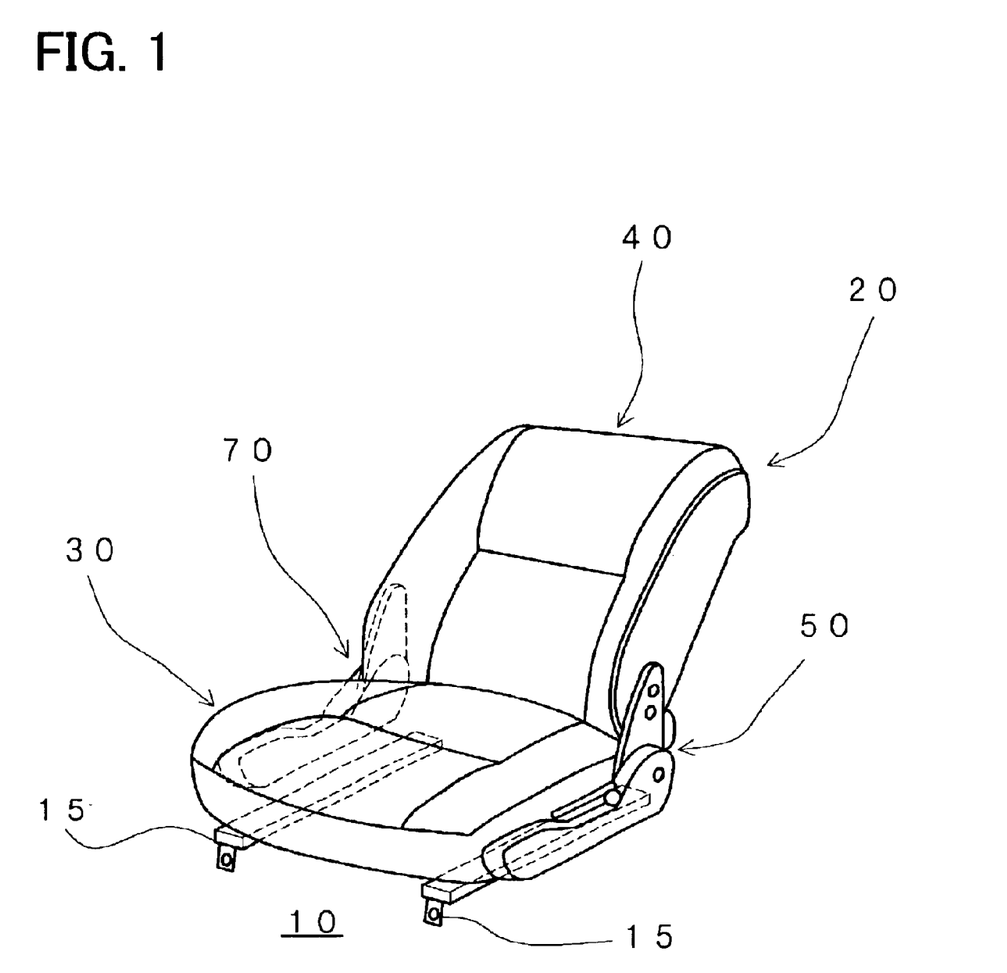
FIG. 1 shows the entire structure of a vehicle seat according to one embodiment of the present invention.

A preferred embodiment of a vehicle seat according to the present invention will hereinafter be described with reference to the accompanying drawings. FIG. 1 shows the entire structure of the vehicle seat according to the present embodiment.

In the present embodiment as shown in FIG. 1, a pair of rail units 15 is disposed on vehicle floor 10, and vehicle seat 20 is disposed on rail units 15 so as to be movable frontward or rearward along the rail units 15. Vehicle seat 20 may include seat cushion 30. Vehicle seat 20 may additionally include input side reclining mechanism 50, which is located on one side of seat cushion 30, and output side reclining mechanism 70, which is located on the other side thereof. Vehicle seat 20 may further include seat back 40 that is supported so as to be inclinable relative to seat cushion 30 using input side reclining mechanism 50 and output side reclining mechanism 70.

Figure 2:
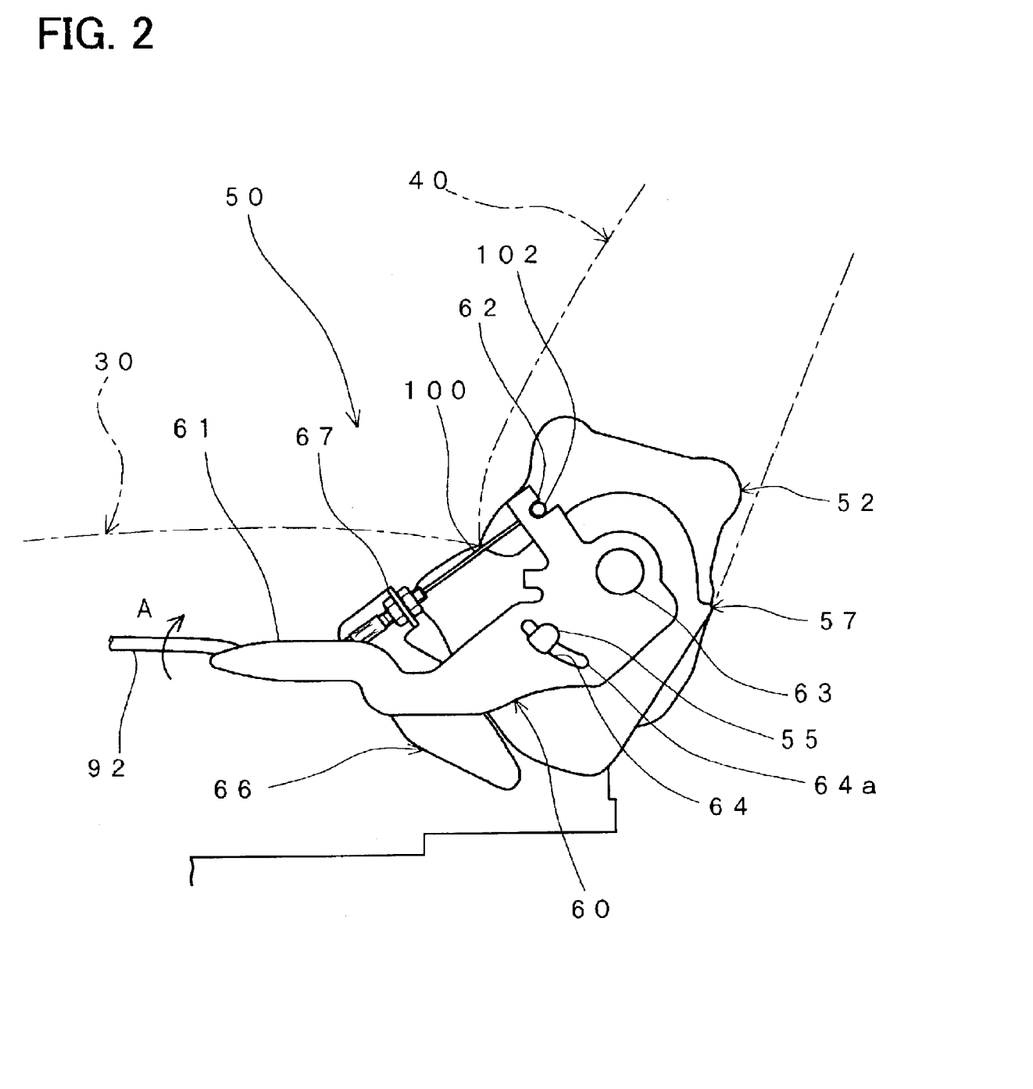
FIG. 2 shows an input side reclining mechanism as viewed from one side of the vehicle seat.
Figure 3:
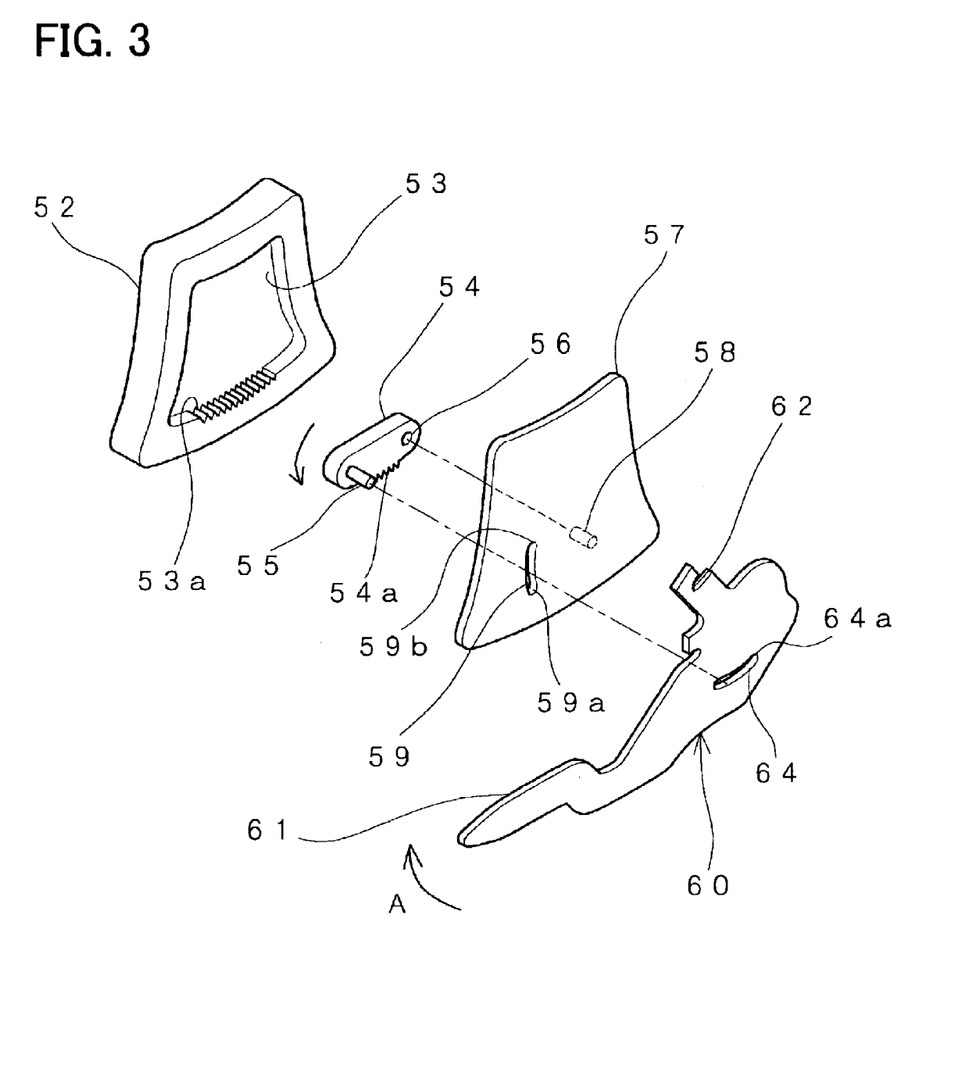
FIG. 3 is an explanatory view showing the inner structure of the input side reclining mechanism.

Input side reclining mechanism 50 and output side reclining mechanism 70, which are significant aspects of the present invention, will now be described in detail. First, the structure of input side reclining mechanism 50 will be explained in detail with reference to FIGS. 2 and 3. FIG. 2 shows input side reclining mechanism 50 as viewed from the side of vehicle seat 20. FIG. 3 is an explanatory view showing the inner structure of input side reclining mechanism 50.

As shown in FIG. 2, input side reclining mechanism 50 may include: a fixed plate 52, which is affixed to the lower end of one side of seat back 40; base plate 57, which is affixed to the rear end of the one side of seat cushion 30; and manipulation lever 60, which is attached to base plate 57.

Referring to FIG. 3, fixed plate 52 may be a member having a predetermined thickness, and may include recess 53 defined within a face that opposes base plate 57. Ratchet 53a may be formed on the bottom of recess 53.

Cam 54 may be accommodated within recess 53. Cam 54 may include ratchet 54a, which engages ratchet 53a of recess 53. Cam 54 may additionally include guide pin 55, which projects from the vicinity of one side-end of cam 54. Cam 54 may further include receiving hole 56, which is defined within the vicinity of the other side-end thereof. Guide pin 55 may be inserted into guide groove 59, which is defined within base plate 57. Receiving hole 56 may receive pivot pin 58, which projects from base plate 57. Accordingly, cam 54 is pivotable about pivot pin 58; therefore, when cam 54 pivots, guide pin 55 moves within guide groove 59.

Cam 54 is urged in the direction of arrow B, which is shown in FIG. 3, by a spring, which is not shown. Thus, ratchet 54a of cam 54 normally engages ratchet 53a of recess 53.

As shown in FIG. 2, manipulation lever 60 may be attached to base plate 57 so as to be pivotable about pivot shaft 63. Manipulation lever 60 may include cable-end coupling portion 62, to which cable end 102 of inner cable 100 is coupled. Manipulation lever 60 may additionally include guide groove 64; guide pin 55 passes through guide groove 59 of base plate 57 and can move within guide groove 64 (see FIG. 3).

Further, as shown in FIG. 2, outer-casing coupling member 66 may be affixed to seat cushion 30 near base plate 57. Outer-casing coupling member 66 may include outer-casing coupling portion 67, to which outer casing 92 is coupled.

Figure 4:
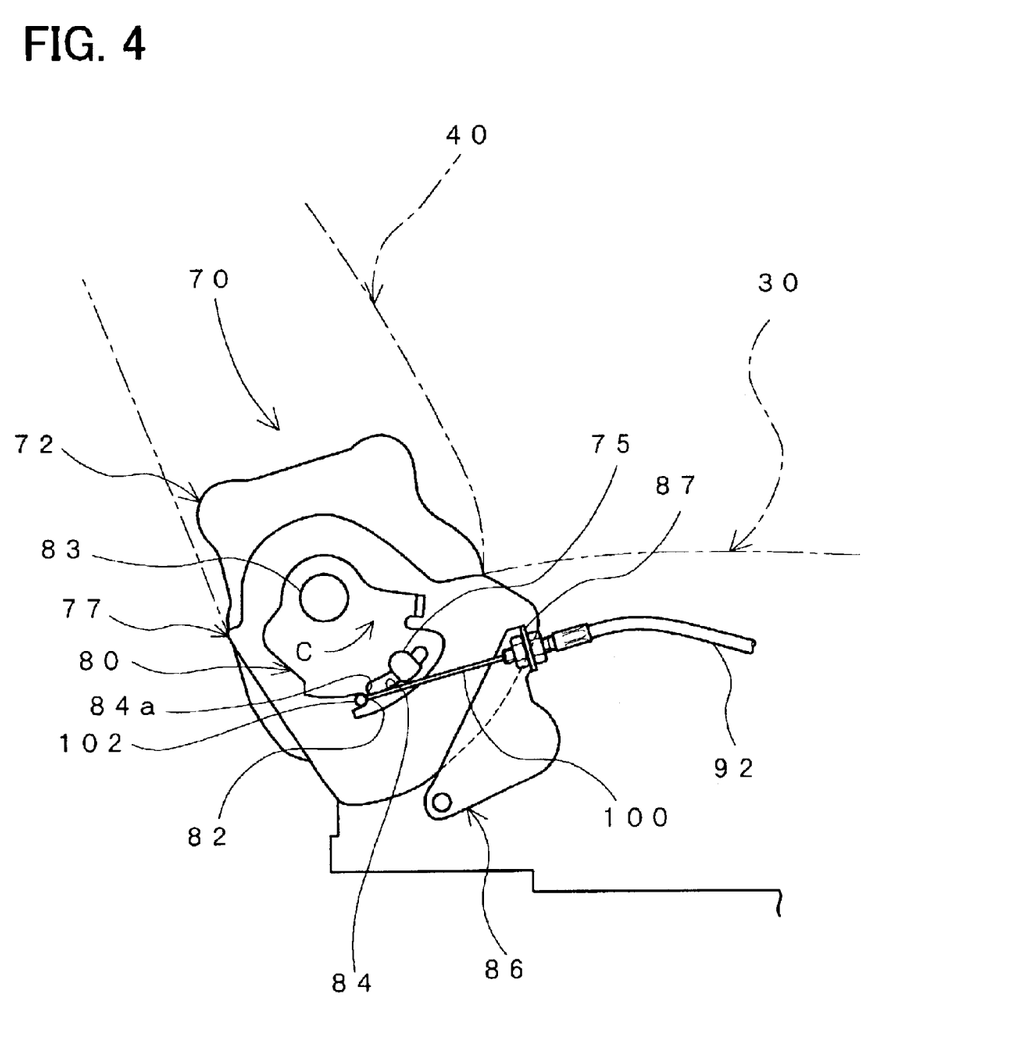
FIG. 4 shows an output side reclining mechanism as viewed from one side of the vehicle seat.

The structure of output side reclining mechanism 70 will now be described with reference to FIG. 4. FIG. 4 shows output side reclining mechanism 70 as viewed from the other side of vehicle seat 20.

Output side reclining mechanism 70 has a structure that is substantially the same as input side reclining mechanism 50. As shown in FIG. 4, output side reclining mechanism 70 may include: fixed plate 72 (having the same structure as fixed plate 52 of input side reclining mechanism 50), which is affixed to the lower end of the other side of seat back 40; base plate 77 (having the same structure as base plate 57 of input side reclining mechanism 50), which is affixed to the rear end of the other side of seat cushion 30; and output side manipulation member 80 (equivalent to manipulation lever 60 of input side reclining mechanism 50), which is attached to base plate 77.

A recess may be defined within fixed plate 72 of output side reclining mechanism 70; a ratchet may be formed within the recess; further, a cam accommodated within the recess of fixed plate 72 may include a ratchet that engages the ratchet of fixed plate 72. These features are also the same as the structural features of input side reclining mechanism 50.

One difference between input side reclining mechanism 50 and output side reclining mechanism 70 is that manipulation lever 60 of input side reclining mechanism 50 pivots when manipulated by a person who is manipulating the lever 60, on the other hand, output side manipulation member 80 of output side reclining mechanism 70 pivots when movement of manipulation lever 60 is transmitted to output side manipulation member 80 via control cable 90.

Therefore, output side manipulation member 80 does not include a portion that is equivalent to grip 61 of manipulation lever 60. However, other features of the structure of output side manipulation member 80 are the same as the structural features of manipulation lever 60. For example, output side manipulation member 80 is attached to base plate 77 so as to be pivotable about pivot shaft 83; cable-end coupling portion 82 is defined within output side manipulation member 80; and guide groove 84 is formed so as to guide guide pin 75 of the cam, which is accommodated within the recess of fixed plate 72.

Further, also in output side reclining mechanism 70, outer-casing coupling member 86 may be affixed to seat cushion 30 near base plate 77. Outer-casing coupling member 86 may also include outer coupling portion 87.

The position where cable-end coupling portion 82 is disposed (e.g., the distance from the rotational center of output side manipulation member 80) will be described below in detail.

Figure 5:
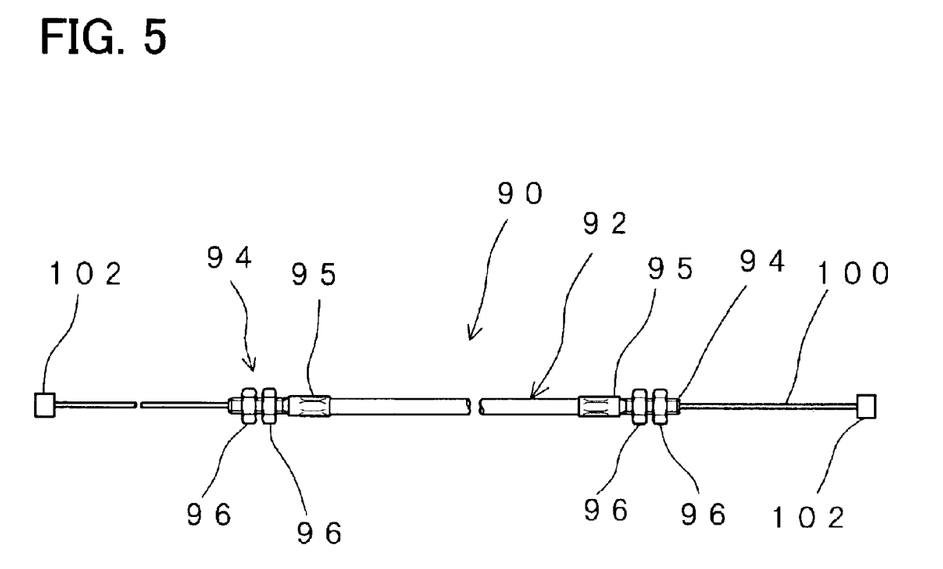
FIG. 5 schematically shows the structure of a control cable.
Figure 6:
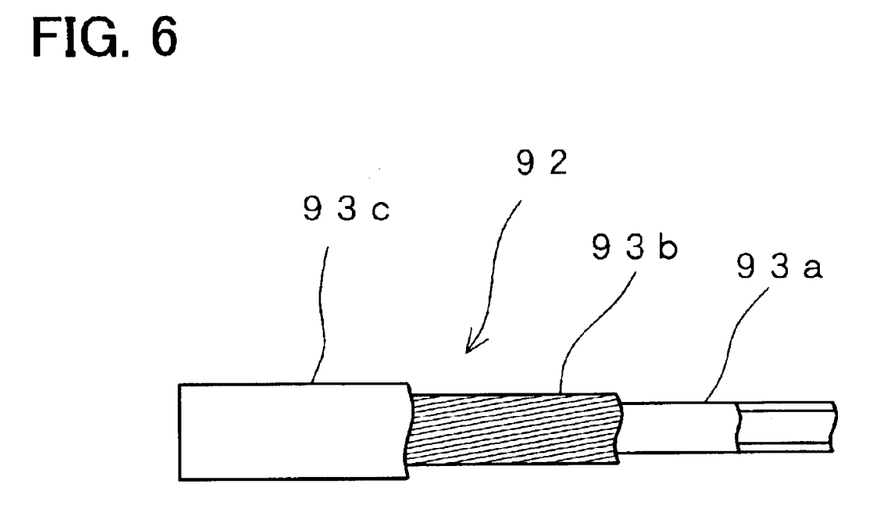
FIG. 6 is an explanatory view showing the structure of an outer casing.
Figure 7:
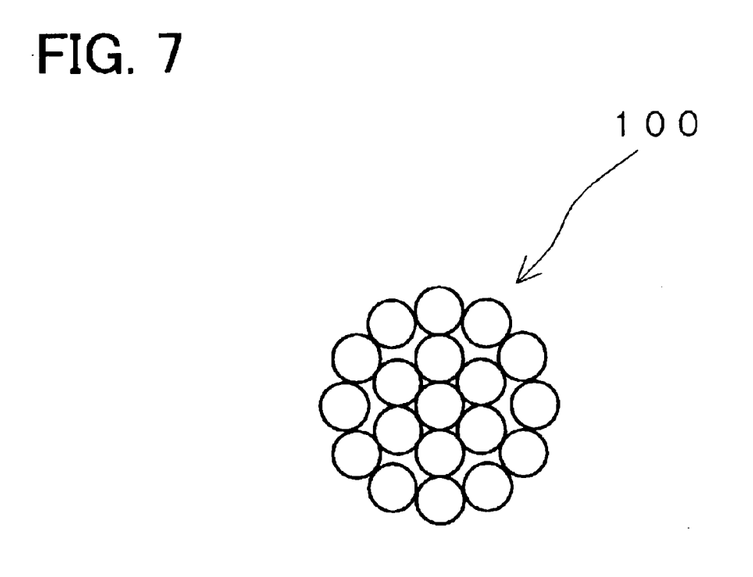
FIG. 7 is a cross-sectional view of an inner cable.

Next, control cable 90, which is disposed between manipulation lever 60 and output side manipulation member 80, will be explained with reference to FIGS. 5–7. FIG. 5 is a schematic view showing the structure of control cable 90. FIG. 6 is an explanatory view showing the structure of outer casing 92. FIG. 7 is a cross-sectional view showing inner cable 100.

As shown in FIG. 5, control cable 90 may include outer casing 92 and inner cable 100, which is inserted within outer casing 92 so as to be axially movable within outer casing 92.

As shown in FIG. 6, outer casing 92 may have a three-layer structure that may consist of casing tube 93a; a strand layer 93b, which is formed on the outside of casing tube 93a; and outer jacket 93c, which is disposed on the outside of strand layer 93b. Casing tube 93a may be formed from a resin, such as polyethylene. Strand layer 93b may be formed by winding a plurality of strands (of hard steel wire) around casing tube 93a at a predetermined pitch. Outer jacket 93c may be made of a resin, such as polypropylene, and may be formed by coating the outside of strand layer 93b with a resin using known methods.

In addition, as shown in FIG. 5, freely-movable length adjusters 94 may be affixed to each end of outer casing 92. Each length adjuster 94 may include: end cap 95, which is secured to the corresponding end of outer casing 92, and a pair of freely-movable length adjustment nuts 96, which engage a thread formed on the corresponding end cap 95. The position of each pair of adjustment nuts 96 can be changed relative to corresponding end cap 95 by adjusting the amount that adjustment nut 96 is screwed onto the thread of the corresponding end cap 95.

Inner cable 100, which is inserted into the above-described strand-type outer casing 92, may include cable ends 102 at each end, as shown in FIG. 5. Inner cable 100 may be a single-strand type cable, which is formed by twisting a plurality of element wires (made of one type of material), as shown in FIG. 7.

Inner cable 100 of the present embodiment utilizes a single-strand type cable and does not utilize a multi-strand type cable. Therefore, even when tightly pulled, stretching of inner cable 100 can be minimized.

Figure 8:
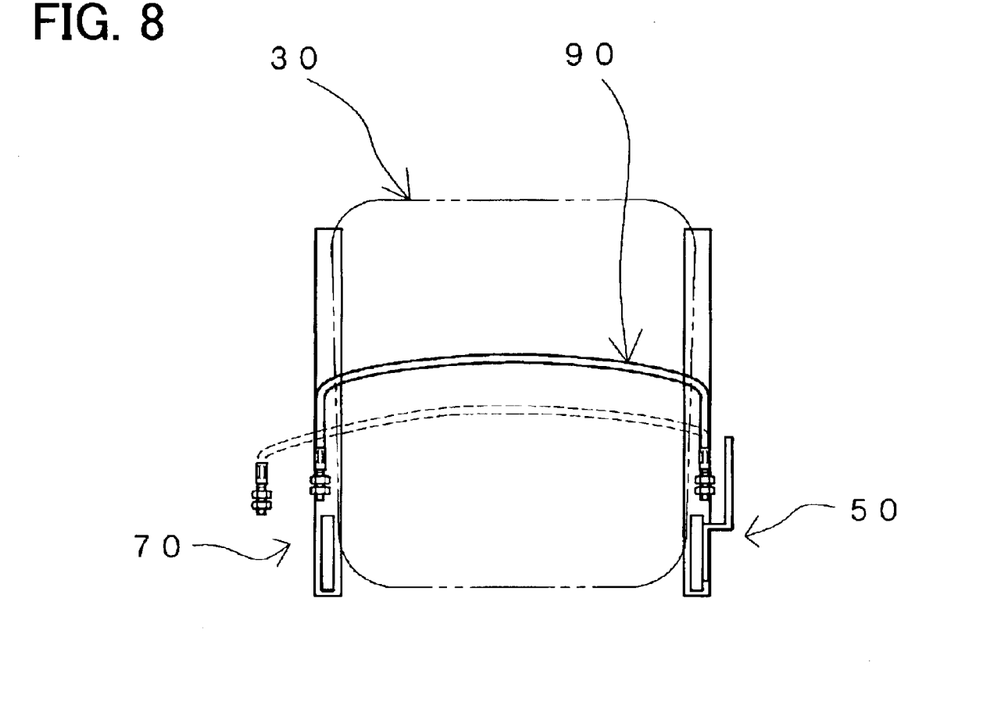
FIG. 8 is a top view of the vehicle seat with the control cable disposed relative to the vehicle seat.
Figure 9:
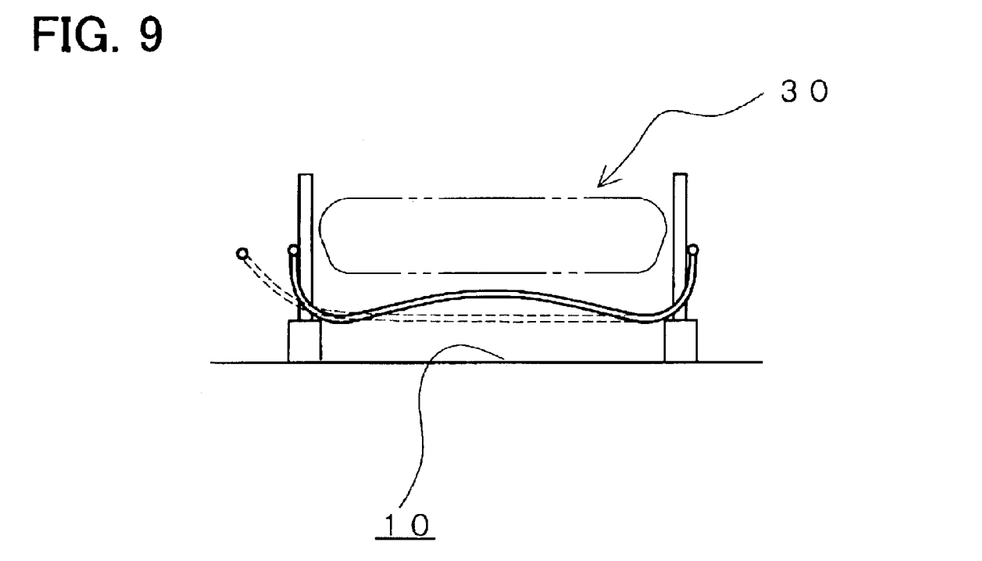
FIG. 9 is a side view of the vehicle seat of FIG. 8.

One example of a method for installing control cable 90 with respect to input side reclining mechanism 50 and output side reclining mechanism 70 will now be described with reference to FIGS. 8 and 9. FIG. 8 is a top view showing a vehicle seat with control cable 90 disposed relative to the vehicle seat. FIG. 9 is a front view showing the vehicle seat of FIG. 8.

In order to install control cable 90 with respect to reclining mechanisms 50, 70, one cable end 102 of inner cable 100 may be coupled to cable-end coupling portion 62 of the above-described manipulation lever 60 (see FIG. 2). Then, control cable 90 may be extended to the opposite side of seat cushion 30 through a space defined between vehicle floor 10 and seat cushion 30 (see FIG. 9). Thereafter, the other cable end 102 of inner cable 100 may be coupled to cable-end coupling portion 82 of output side manipulation member 80 (see FIG. 4).

Outer casing 92 of control cable 90 may be coupled to outer-casing coupling members 66, 86 (see FIGS. 2 and 4) at the same time that the respective ends of inner cable 100 are coupled to manipulation lever 60 and output side manipulation member 80. Specifically, outer-casing coupling portion 67 of outer-casing coupling member 66 is firmly held between the pair of freely-movable length adjustment nuts 95, which are attached to one end of outer casing 92. Thus, the one end of outer casing 92 is secured to outer-casing coupling member 66. The other end of outer casing 92 is secured to outer-casing coupling member 86 in the same manner.

The effective length of outer casing 92 may be changed by adjusting the positions of the pairs of adjustment nuts 96, which pairs are attached to the respective ends of outer casing 92. Thus, inner cable 100 can be disposed between manipulation lever 60 and output side manipulation member 80 without slack. However, even if inner cable 100 hangs loosely due to a manufacturing error, the optimum length of control cable 90 can be ensured by adjusting the positions of adjustment nuts 96, which are attached to each end of outer casing 92. In control cable 90 according to the present embodiment, by providing a pair of adjustment nuts 94 at the respective ends of outer casing 92, length adjustment from both sides of the vehicle seat is possible.

Control cable 90 is preferably disposed between manipulation lever 60 and output side manipulation member 80 so as to hang loosely in approximately a W-shape between vehicle floor 10 and seat cushion 30, as shown in FIG. 9. This configuration is utilized because, if the vehicle seat is deformed in a traffic accident, such as a collision, and control cable 90 is not provided with any extra length, control cable 90 may not be actuatable; as a result, output side reclining mechanism 70 can not be unlocked, even if manipulation lever 60 is manipulated.

According to the vehicle seat of the present embodiment, even if the vehicle seat is deformed, control cable 90 absorbs the deformation (dotted lines in FIGS. 8 and 9 show one example of the position of control cable 90 after the vehicle seat has been deformed); therefore, output side reclining mechanism 70 can be actuated.

The operation of vehicle seat 20, when seat back 40 is inclined from a non-inclinable state relative to seat cushion 30 will now be described.

When seat back 40 is prevented from inclining relative to seat cushion 30, ratchet 53a of recess 53 of fixed plate 52 of input side reclining mechanism 50 remains engaged with ratchet 54a of cam 54 of input side reclining mechanism 50, thereby preventing fixed plate 52 from moving relative to base plate 57. In the same manner, fixed plate 72 and base plate 77 of output side reclining mechanism 70 are prevented from moving relative to each other.

First, the operation of input side reclining mechanism 50 will be described with reference to FIG. 2.

In order to recline seat back 40, manipulation lever 60 is manipulated by grasping grip 61 and rotating manipulation lever 60 in the direction of arrow A, which is shown in FIG. 2. When manipulation lever 60 begins rotating in the direction of arrow A, guide pin 55 (of cam 54) has not yet begun to rotate. As manipulation lever 60 pivots, guide pin 55 moves along guide groove 64 towards end 64a of guide groove 64. When manipulation lever 60 is further rotated in the direction of arrow A after guide pin 55 has contacted end 64a of guide groove 64, guide pin 55 rotates (i.e., cam 54 rotates) together with rotation of manipulation lever 60. As a result, ratchet 54a of cam 54 disengages from ratchet 53a of fixed plate 52, which permits fixed plate 52 to move relative to base plate 57 (i.e., input side reclining mechanism 50 is unlocked).

Next, the operation of output side reclining mechanism 70 will be explained with reference to FIG. 4.

As manipulation lever 60 rotates in the direction of arrow A shown in FIG. 2, cable end 102 of inner cable 100, which is coupled to cable-end coupling portion 62, is pulled (i.e., inner cable 100 is pulled out from outer casing 92). When cable end 102, which is coupled to manipulation lever 60, is pulled, the other cable end 102 of inner cable 100, which is coupled to output side manipulation member 80, is also pulled. Consequently, output side manipulation member 80 of output side reclining mechanism 70 rotates in the direction of arrow C shown in FIG. 4.

As output side manipulation member 80 rotates in the direction of arrow C, guide pin 75 moves along guide groove 84 towards end 84a of guide groove 84. When output side manipulation member 80 further rotates after guide pin 75 has contacted end 84a of guide groove 84, guide pin 55 (of the output side cam) rotates together with the rotation of output side manipulation member 80. As a result, the output side cam disengages from fixed plate 72, which permits fixed plate 72 to move relative to base plate 77 (i.e., output side reclining mechanism 70 is unlocked).

When reclining mechanisms 50, 70 on both sides are unlocked in such a manner, seat back 40 can be inclined relative to seat cushion 30.

After seat back 40 is made inclinable by the above-described steps, seat back 40 is positioned at the desired angle of inclination. Then, reclining mechanisms 50, 70 are each brought back into a locked condition from the unlocked condition. The operation of reclining mechanisms 50, 70 at this time will now be briefly described.

While manipulation lever 60 is maintained in the pulled position, seat back 40 is inclined and positioned at the desired angle. Thereafter, manipulation lever 60 is returned to its original position. (In practice, manipulation lever 60 is urged by a spring, which is not shown, in the direction opposite to arrow A shown in FIG. 2. Therefore, the manipulation lever 60 is manipulated by simply releasing lever 60.) When manipulation lever 60 is returned to the original position, cam 54 is also returned to its original position due to the force of the spring. Consequently, ratchet 54a of cam 54 engages ratchet 53a of fixed plate 52, which prevents fixed plate 52 from moving relative to base plate 57 (i.e., input side reclining mechanism 50 is locked).

Likewise, in output side reclining mechanism 70, the output side cam is returned to its original position due to the force of the spring. As a result, fixed plate 72 is prevented from moving relative to base plate 77 (i.e., output side reclining mechanism 70 is locked).

Thus, seat back 40 is held in position at the desired angle relative to seat cushion 30.

Figure 10:
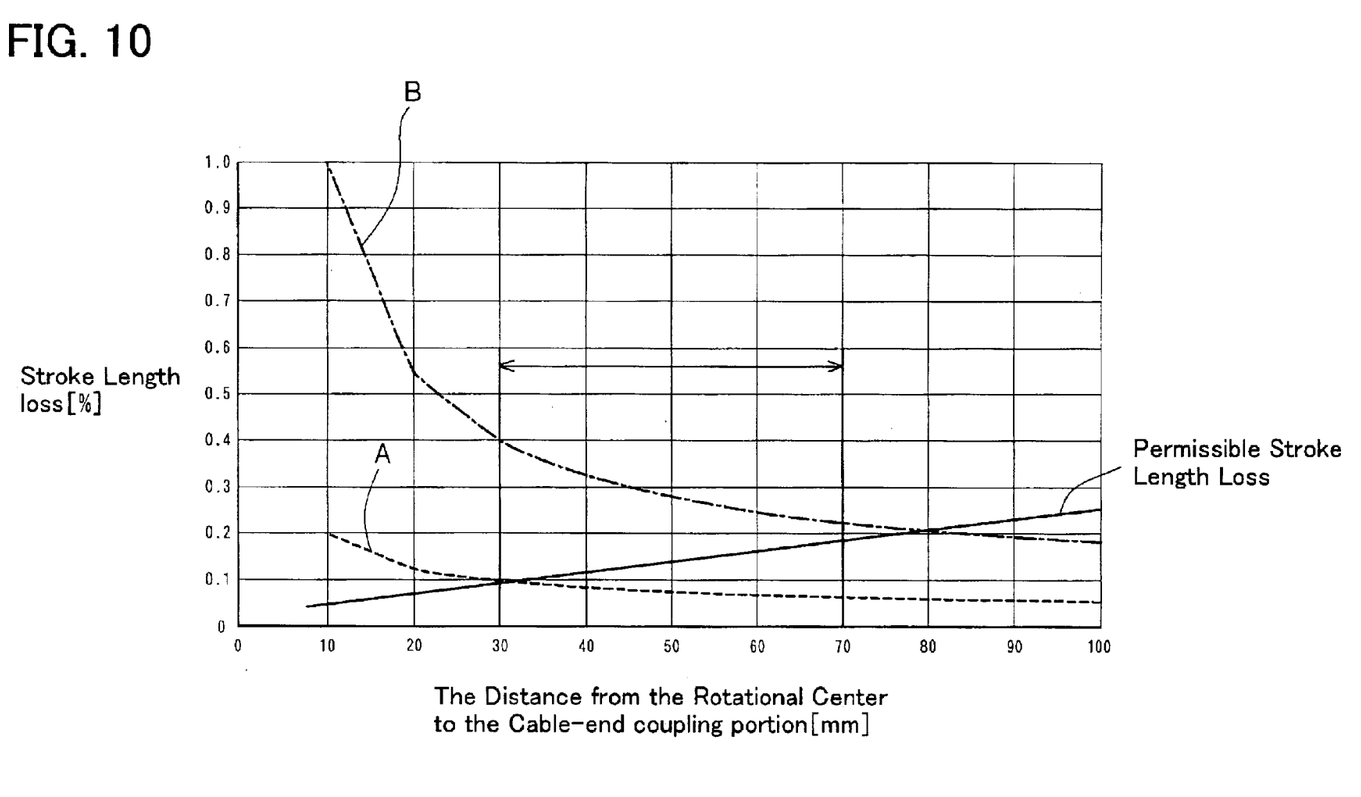
FIG. 10 is a graph showing the relationship between stroke length loss and the radius from a coupled position of a cable end.

In the vehicle seat according to the present embodiment, the position of cable-end coupling portion 82 may be preferably adjusted so that stroke length loss of control cable 90 is less than a permissible stroke length loss. The position of cable-end coupling portion 82 will now be explained in detail with reference to FIG. 10. FIG. 10 shows the relationship between stroke length loss (expressed by % of the entire length of the control cable) and the distance R (mm) between the rotational center of output side manipulation member 80 and cable-end coupling portion 82.

First, the permissible stroke length loss of control cable 90 will be explained. Herein, the pivot angle of output side manipulation member 80, which is required to unlock output side reclining mechanism 70, is represented by θ and the theoretical pivot angle of output side manipulation member 80 is represented by θ+d θ.

According to theory, output side manipulation member 80 is pivotable by an angle of (θ+d θ). Therefore, the theoretical stroke length L of cable end 102, which is coupled to output side manipulation member 80, is calculated based upon the following equation:

$$L=R(\theta+d\theta).$$

Once the stroke length L of cable end 102 is calculated, the pivot angle of manipulation lever 60 and the position of cable-end coupling portion 62 of manipulation lever 60 can be adjusted to provide the calculated stroke length L.

In this case, in order to unlock output side reclining mechanism 70, output side manipulation member 80 is rotated by only an angle of θ. Therefore, the permissible stroke length loss ΔL of control cable 90 is Rd θ (FIG. 10 shows one example). As is clear from FIG. 10, the permissible stroke length loss ΔL increases with the distance R, which is the distance between the rotational center of output side manipulation member 80 and cable-end coupling portion 82.

An appropriate value for d θ may be determined by the designer as required. However, a large value is not permitted due to the size limit of a vehicle seat and the requirements for a compact vehicle seat.

The relationship between the stroke length loss of control cable 90 and the distance R between the rotational center of output side manipulation member 80 and cable-end coupling portion 82 will now be discussed.

A moment of inertia is required to rotate the output side cam, which is accommodated within the recess of fixed plate 72, and is represented by M (i.e., the moment that is required to rotate the output side cam against the force of the spring).

Thus, the force F that is required to unlock output side reclining mechanism 70 (i.e., the tensile force that is applied to inner cable 100) is expressed as follows:

$$F=M/R.$$

As is apparent from this equation, as distance R increases, the tensile force F that is applied to inner cable 100 becomes less, and the compressive force that is applied to outer casing 92 also becomes less. That is, as distance R increases, the stroke length loss of control cable 90 decreases in an inversely proportional manner.

Accordingly, by adjusting the distance R between the rotational center of output side manipulation member 80 and cable-end coupling portion 82, the stroke length loss of control cable 90 can be reduced to the permissible stroke length loss or less. Therefore, output side reclining mechanism 70 is reliably unlocked.

Figure 11:
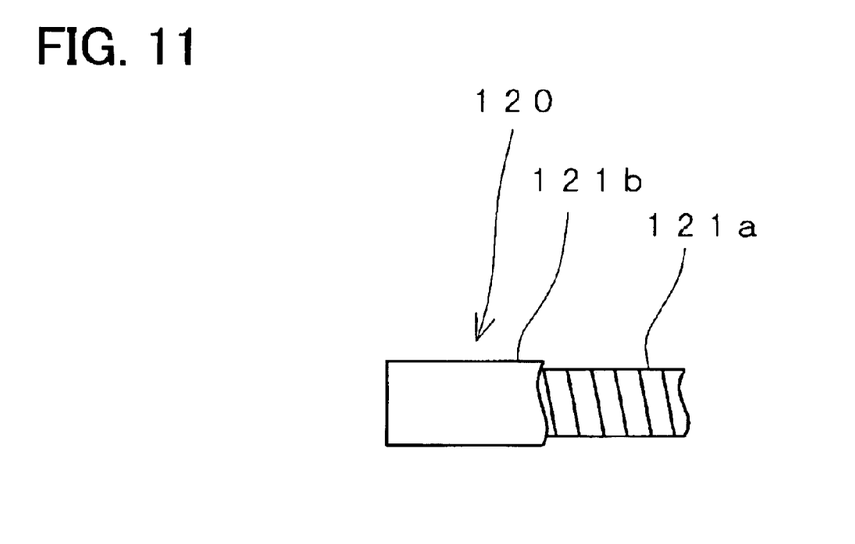
FIG. 11 is an explanatory view showing the structure of a flat-steel type outer casing.

In order to explain the present embodiment in more detail, the measurement results of an exemplary stroke length loss are shown in the graph of FIG. 10. In this case, a control cable (hereinafter referred to as a strand-type control cable) according to the present invention, in which a single-strand type inner cable (θ1.5×19 pieces) is inserted into a strand-type outer casing (φ5), was actually installed in a vehicle seat. The measurement results of another stroke length loss are also provided as a comparative example. In the comparative case, a control cable (hereinafter referred to as a flat steel type control cable), in which a single-strand type inner cable (θ1.5×19 pieces) is inserted into a flat steel type outer casing (φ5), was installed in the same vehicle seat. The flat type control cable has typically been used with vehicle seats (for about 20 years), and includes an outer casing having a structure that is shown in FIG. 11. As shown in FIG. 11, the outer casing of the flat steel type control cable includes flat steel wire 121a that is wound into a continuous series of loops, such that each loop firmly contacts the adjacent loop. The flat steel type control cable further includes outer jacket 121b that is disposed around the steel wire 121a.

As shown in FIG. 10, the stroke length loss (indicated by reference letter A) of the strand-type control cable is less than the stroke length loss (indicated by reference letter B) of the flat steel-type control cable.

In the strand-type control cable, when the distance R from the rotational center is approximately 30 mm or greater, the stroke length loss is less than or equal to the allowable stroke length loss ΔL. On the other hand, in the flat steel type control cable, when the distance R from the rotational center is approximately 80 mm or greater, the stroke length loss is less than or equal to the allowable stroke length loss ΔL.

Accordingly, the measurement results demonstrate that decreasing the stroke length loss to the allowable stroke length loss or less does not enable the flat steel type control cable to satisfy the conditions in which the dimension of output side manipulation member 80 must be smaller than the thickness of seat back 40 (i.e., the distance R from the rotational center must be less than or equal to 70 mm).

Therefore, the inventor concluded from the measurements that output side reclining mechanism 70 of the vehicle seat can be reliably unlocked by using a strand-type control cable, which includes a single-strand type inner cable, and by setting the distance R between the rotational center of output side manipulation member 80 and cable-end coupling portion 82 to 30 mm or greater.

Based upon the above-described measurement results, in the vehicle seat according to the present embodiment, cable-end coupling portion 82 is disposed in such a position so that the distance R from the rotational center of the output side manipulation member 80 is within 30 to 70 mm.

As was clear from the above discussion, in the vehicle seat according to the present embodiment, the control cable is adjusted so as to be coupled to the predetermined position (i.e., the distance between the rotational center and the cable-end coupling portion is greater than or equal to 30 mm). In addition, a strand type outer casing, which does not easily stretch or shrink, is used as outer casing 92. Further, a single-strand type inner cable, which does not easily stretch, is used as inner cable 100. Therefore, the stroke length loss of control cable 90 can be reduced to the permissible stroke length loss or less, thereby enabling the output side reclining mechanism to be reliably unlocked from a locked condition.

Further, in the vehicle seat of the above-described embodiment, the control cable is coupled to the position that is 70 mm or less from the rotational center of output side manipulation member 80. Therefore, output side manipulation member 80 can be disposed within the thickness of seat back 40. Thus, the vehicle seat can be made compact.

Furthermore, the vehicle seat of the above-described embodiment provides an aesthetic appearance because control cable 90 is inconspicuously disposed between seat cushion 30 and vehicle body floor 10.

Figure 12:
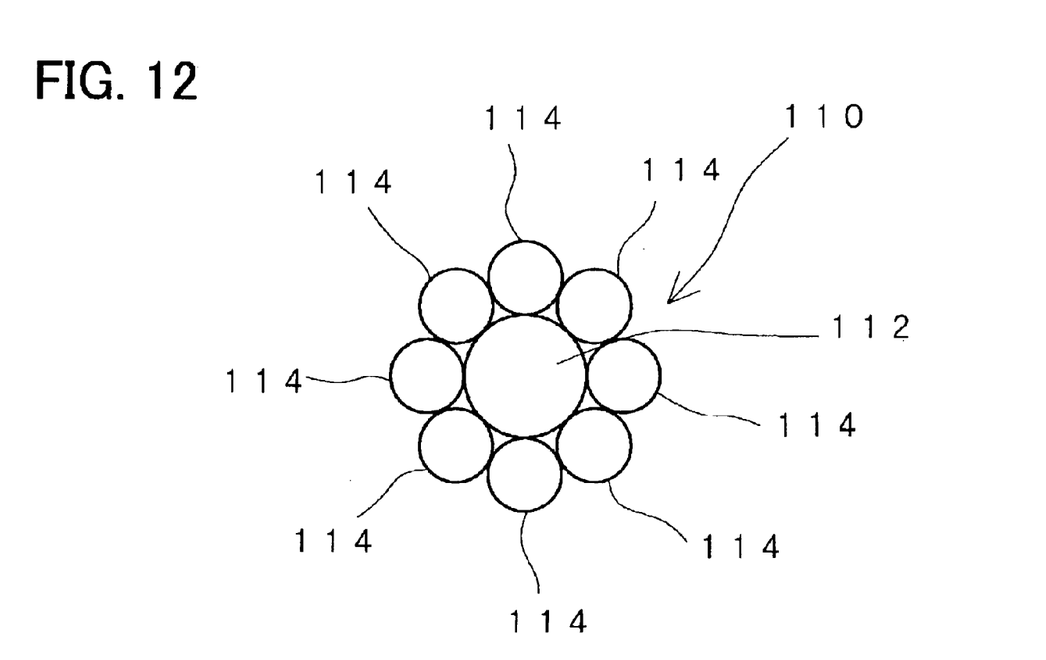
FIG. 12 is a cross-sectional view of a push/pull type inner cable.

In the vehicle seat according to the above-illustrated representative embodiment, a single-strand cable, which transmits only tensile force (pulling force), is used as inner cable 100. However, a push/pull type cable (one type of single-strand cable), which transmits a compressive force (pushing force) as well as tensile force and is shown in FIG. 12, may also be used as inner cable 100. As shown in FIG. 12, the push/pull type cable may have a main wire in the center thereof. The diameter of the main wire may be relatively large. The push/pull type cable may also include auxiliary wires 114. The diameter of each auxiliary wire 114 is smaller than the diameter of main wire 112. The push/pull type cable may be produced by twisting auxiliary wires 114 around main wire 112.

Such a push/pull type cable is capable of transmitting a compressive force (pushing force) via main wire 112, which is disposed in the center of the pull/pull type cable. Therefore, when output side reclining mechanism 70 is switched between an unlocked condition and a locked condition, movement of manipulation lever 60 is transmitted to output side manipulation member 80, consequently, output side reclining mechanism 70 is actuated more reliably.

In the above-described preferred embodiment, a pair of freely-movable length adjuster means is attached to the respective ends of the outer casing. However, the freely-movable length adjuster means may be attached to only one end of the outer casing, in order to simplify the structure of the outer casing and decrease manufacturing costs.

The above-described representative embodiment provides an example of the use of the present invention for the reclining mechanism of the vehicle seat. However, the present invention is not limited thereto and can also be utilized for other mechanisms of the vehicle seat (e.g., a sliding mechanism for sliding the seat against the floor and a jump mechanism for quickly moving the seat upward from the floor into a folded position).

Although a detailed embodiment of the present invention has been described, such description is for illustrative purposes only, and it will be obvious to those skilled in the art that changes and variations may be made without departing from the spirit of the invention.

What is claimed is:

1. An apparatus comprising:
   an input side switching mechanism comprising a first fixed plate arranged and constructed to be attached to a seat back, a first base plate arranged and constructed to be attached to a seat cushion, a lever pivotably coupled to the base plate and a first lock releasably fixing the fixed plate with respect to the base plate, wherein the first lock is coupled to the lever,
   an output side switching mechanism comprising a second fixed plate arranged and constructed to be attached to the seat back, a second base plate arranged and constructed to be attached to the seat cushion, an output side manipulation member rotatably coupled to the base plate and a second lock releasably fixing the fixed plate with respect to the base plate, wherein the second lock is coupled to the output side manipulation member, and
   a control cable coupling and transmitting movement of the lever to the output side manipulation member, whereby the output side switching mechanism is actuated in synchronization with the input side switching mechanism, the control cable comprising an inner cable movably disposed within a strand outer casing, wherein the inner cable comprises a push/pull cable having a plurality of auxiliary wires twisted around a main wire.

2. An apparatus as in claim 1, wherein the inner cable transmits tensile force and compressive force.

3. An apparatus as in claim 1, wherein stroke length loss of the control cable has been adjusted to a permissible stroke length loss or less by adjusting a distance between a position, at which the inner cable is coupled to the output side manipulation member, and a rotational center of the output side manipulation member.

4. An apparatus as in claim 1, further comprising means for adjusting the effective length of the outer casing, the adjusting means being disposed on the outer casing.

5. An apparatus as in claim 1, wherein the control cable is arranged and constructed to be disposed between the seat cushion and a vehicle body floor.

6. An apparatus as in claim 1, wherein the strand outer casing comprises a casing tube disposed around the inner cable, a strand layer disposed around the casing tube and an outer jacket disposed around the strand layer.

7. An apparatus as in claim 6, further comprising means for adjusting an effective length of the outer casing, the adjusting means being disposed on the outer casing, wherein stroke length loss of the control cable has been adjusted to a permissible stroke length loss or less by adjusting a distance between a position, at which the inner cable is coupled to the output side manipulation member, and a rotational center of the output side manipulation member, and wherein the control cable is arranged and constructed to be disposed between the seat cushion and a vehicle body floor.

8. An apparatus comprising:
   an input side switching mechanism comprising a first fixed plate arranged and constructed to be attached to a seat back, a first base plate arranged and constructed to be attached to a seat cushion, a lever pivotably coupled to the base plate and a first lock releasably fixing the fixed plate with respect to the base plate, wherein the first lock is coupled to the lever,
   an output side switching mechanism comprising a second fixed plate arranged and constructed to be attached to the seat back, a second base plate arranged and constructed to be attached to the seat cushion, an output side manipulation member rotatably coupled to the base plate and a second lock releasably fixing the fixed plate with respect to the base plate, wherein the second lock is coupled to the output side manipulation member, and a control cable coupling and transmitting movement of the lever to the output side manipulation member, whereby the output side switching mechanism is actuated in synchronization with the input side switching mechanism, the control cable comprising an inner cable movably disposed within a strand outer casing, wherein the strand outer casing comprises a casing tube disposed around the inner cable, a strand layer disposed around the casing tube and an outer jacket disposed around the strand layer.

9. An apparatus as in claim 8, wherein the inner cable comprises a single-strand cable.

10. An apparatus as in claim 9, wherein the inner cable only transmits tensile force.

11. An apparatus as in claim 8, wherein the inner cable comprises a push/pull cable having a plurality of auxiliary wires twisted around a main wire.

12. An apparatus as in claim 11, wherein the inner cable transmits tensile force and compressive force.

13. An apparatus as in claim 8, wherein stroke length loss of the control cable has been adjusted to a permissible stroke length loss or less by adjusting a distance between a position, at which the inner cable is coupled to the output side manipulation member, and a rotational center of the output side manipulation member.

14. An apparatus as in claim 8, further comprising means for adjusting the effective length of the outer casing, the adjusting means being disposed on the outer casing.

15. An apparatus comprising:

an input side switching mechanism comprising a first fixed plate arranged and constructed to be attached to a seat back, a first base plate arranged and constructed to be attached to a seat cushion, a lever pivotably coupled to the base plate and a first lock releasably fixing the fixed plate with respect to the base plate, wherein the first lock is coupled to the lever, an output side switching mechanism comprising a second fixed plate arranged and constructed to be attached to the seat back, a second base plate arranged and constructed to be attached to the seat cushion, an output side manipulation member rotatably coupled to the base plate and a second lock releasably fixing the fixed plate with respect to the base plate, wherein the second lock is coupled to the output side manipulation member, and a control cable coupling and transmitting movement of the lever to the output side manipulation member, whereby the output side switching mechanism is actuated in synchronization with the input side switching mechanism, the control cable comprising an inner cable movably disposed within a strand outer casing, wherein stroke length loss of the control cable has been adjusted to a permissible stroke length loss or less by adjusting a distance between a position, at which the inner cable is coupled to the output side manipulation member, and a rotational center of the output side manipulation member.

16. An apparatus as in claim 15, wherein the inner cable comprises a single-strand cable.

17. An apparatus as in claim 16, wherein the inner cable only transmits tensile force.

18. An apparatus as in claim 15, wherein the inner cable comprises a push/pull cable having a plurality of auxiliary wires twisted around a main wire.

19. An apparatus as in claim 18, wherein the inner cable transmits tensile force and compressive force.

20. An apparatus as in claim 15, wherein the strand outer casing comprises a casing tube disposed around the inner cable, a strand layer disposed around the casing tube and an outer jacket disposed around the strand layer.

* * * * *